United States Patent [19]

Nesbitt et al.

[11] Patent Number: 4,640,045
[45] Date of Patent: Feb. 3, 1987

[54] FLOWER SADDLE FOR TOMBSTONES

[76] Inventors: Richard L. Nesbitt, 501 West Jensen; Ricky R. Sievers, Rte. 2, both of Newell, Iowa 50568

[21] Appl. No.: 704,964

[22] Filed: Feb. 25, 1985

[51] Int. Cl.[4] ............................................. A01G 9/02
[52] U.S. Cl. ........................................... 47/66; 47/39; 47/41 R
[58] Field of Search ........... 47/40, 41 R, 41.11–41.13, 47/39, 66; 248/311.2, 231.4, 214

[56] References Cited

U.S. PATENT DOCUMENTS

| | | | |
|---|---|---|---|
| 1,421,327 | 6/1922 | Waters | 47/41.2 |
| 1,492,048 | 4/1924 | Reilly | 47/41.1 |
| 1,786,994 | 12/1930 | Halberstadter | 47/39 |
| 2,504,583 | 4/1950 | Rachic | 47/41 |
| 2,639,878 | 5/1953 | Pierce | 47/41 |
| 2,721,718 | 10/1955 | Wagner | 248/311.2 |
| 2,732,091 | 1/1956 | Kass | 47/41 |
| 3,142,934 | 8/1964 | Mehling | 47/41 |
| 3,310,911 | 3/1967 | Boser et al. | 47/39 |
| 3,332,652 | 7/1967 | Oaks | 47/41 |
| 3,511,461 | 5/1970 | Clark | 47/39 X |
| 4,282,683 | 8/1981 | Frankel | 47/41 R |

Primary Examiner—Robert A. Hafer
Assistant Examiner—Danton DeMille
Attorney, Agent, or Firm—Henderson & Sturm

[57] ABSTRACT

A saddle adapted to be attached to a top portion of a grave marker and having a clamp attached to the bottom thereof for selectively securing the saddle to such grave marker or tombstone. A structure for holding decorative objects such as a planter box for holding flowers or the like is attached to the saddle whereby decorative objects can be displayed on a tombstone or other grave marker and are held up out of the way from lawnmowers or other cemetery trimming machines.

6 Claims, 6 Drawing Figures

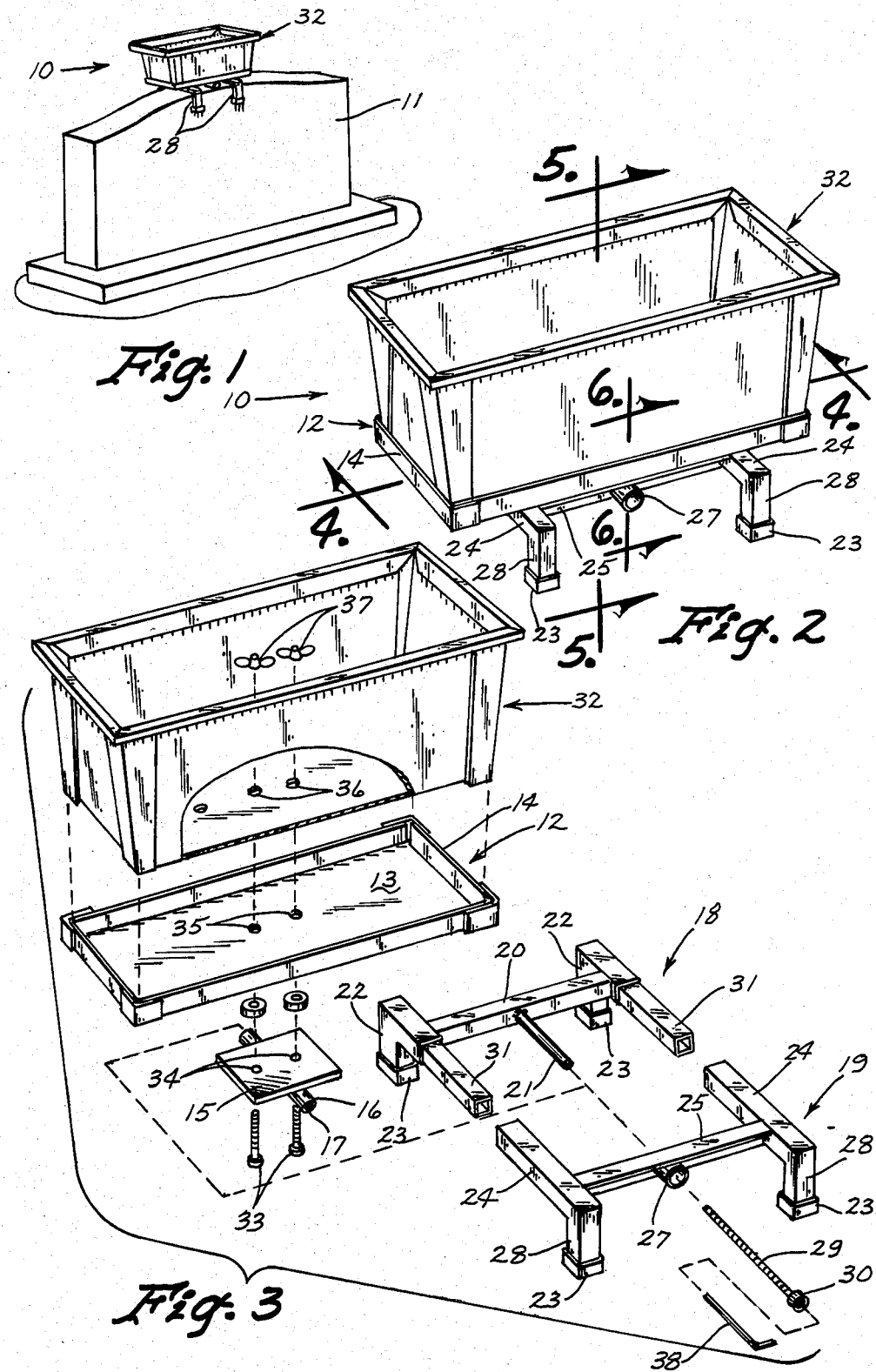

U.S. Patent  Feb. 3, 1987  Sheet 2 of 2  4,640,045
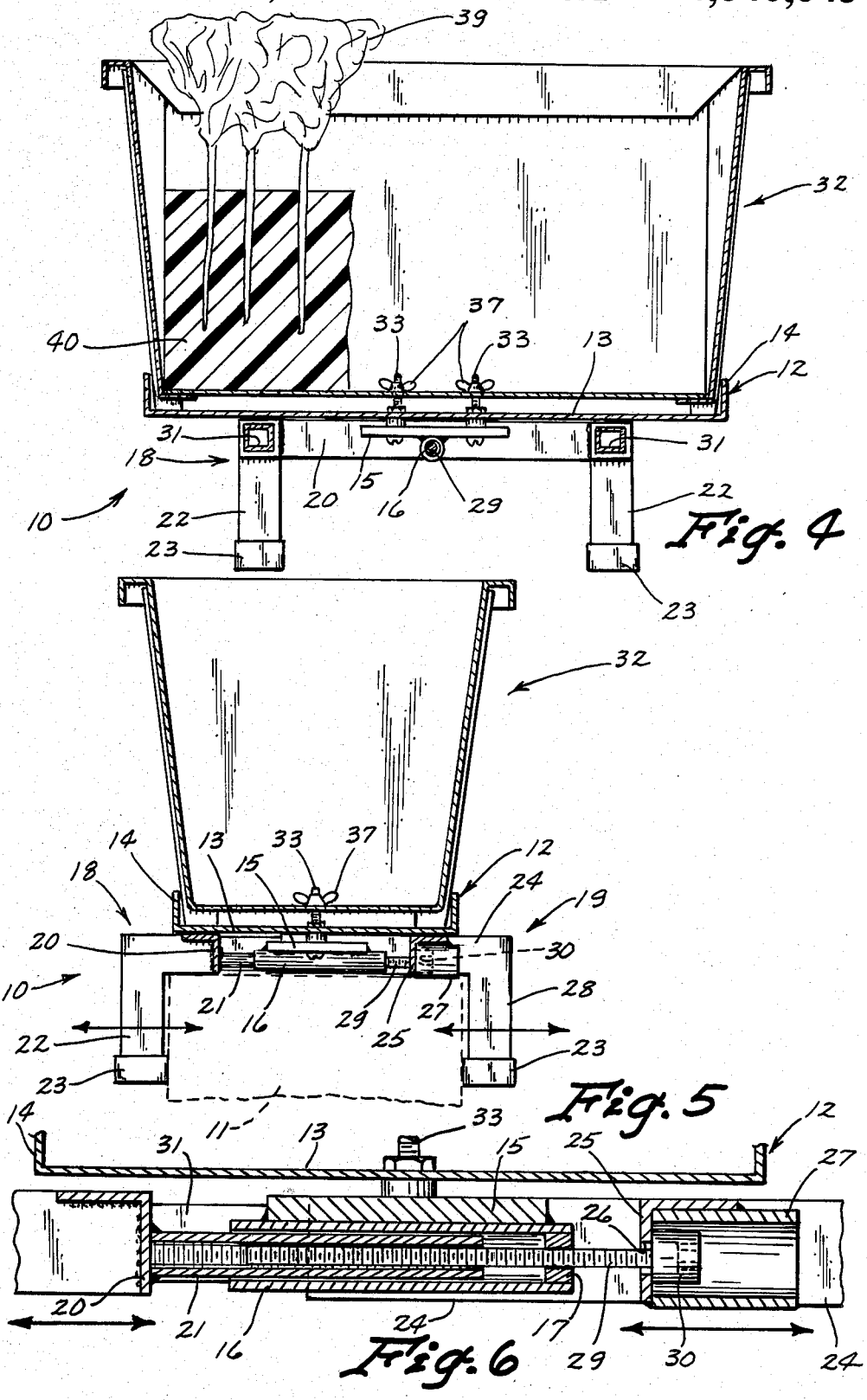

FLOWER SADDLE FOR TOMBSTONES

TECHNICAL FIELD

The present invention relates generally to an apparatus for displaying decorations such as flowers adjacent to a grave, and more particularly to such an apparatus which attaches to a grave marking stone.

BACKGROUND ART

It is customary to place decorations adjacent to a tombstone or other grave marker by placing a container having flowers or other decorations therein adjacent to such stone on the ground. This creates a problem for cemetery caretakers who mow around tombstones, grave markers and the like. Consequently, cemeteries have promulgated rules requiring that decorations such as flowers, plants, plastic flowers and the like must be removed prior to the days that the mowing and trimming around the grave markers is to be done. Typically, however, people placing such decorations near a grave want the decorations to be displayed as long as possible and are greatly inconvenienced by the necessity to return to the gravesite to remove such decorations prior to the mowing and trimming process.

Because the aforementioned problem is a long-standing one, certain solutions to the problem have been proposed over the years. For example, in 1924 U.S. Pat. No. 1,492,048 granted to Reilly proposed to build a flower box recess into a tombstone or the like so that flowers can be permanently planted therein or a planter box can be received within the recess of such a stone. In 1953, U.S. Pat. No. 2,639,878 was granted to Pierce wherein it was proposed that a planter box or the like is supported on a tombstone base and is held in place by stakes which extend into the ground adjacent to the base of the tomstone. In 1964, U.S. Pat. No. 3,142,934 was granted to Mehling which shows a metal vase-like structure with a suction cup on the bottom thereof for attaching to the base of a tombstone or the like to keep the vase up off the ground and obviating the necessity to return and remove the flower or plant holder prior to a mowing and trimming day.

Despite these various attempts to solve the aforementioned problem over the years, these patented structures have not come into widespread commercial usage, it is speculated for the reason that they are not entirely practical and suffer from many shortcomings.

DISCLOSURE OF THE INVENTION

The present invention relates to a saddle adapted to be attached to a top portion of a grave marker and having a clamp attached to the bottom thereof for selectively securing the saddle to such grave marker or tombstone. A structure for holding decorative objects such as a planter box for holding flowers or the like is attached to the saddle whereby decorative objects can be displayed on a tombstone or other grave marker and are held up out of the way from lawnmowers or other cemetery trimming machines.

An object of the present invention is to provide an improved decorative object holding apparatus.

Another object of the present invention is to provide an apparatus for attaching decorative objects to a tombstone or the like so that such decorative objects can be displayed and are held up off of the ground so that lawnmowing or trimming can be accomplished around such tombstone.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of the apparatus of the present invention attached to a tombstone or the like;

FIG. 2 is an enlarged perspective view of the preferred embodiment of the present invention;

FIG. 3 is an enlarged, exploded perspective view of the preferred embodiment of the present invention;

FIG. 4 is an enlarged cross-sectional view taken along line 4—4 of FIG. 2;

FIG. 5 is an enlarged cross-sectional view taken along line 5—5 of FIG. 2; and

FIG. 6 is a partial enlarged cross-sectional view taken along line 6—6 of FIG. 2.

BEST MODE FOR CARRYING OUT THE INVENTION

Referring now to the drawings wherein like reference numerals designate identical or corresponding parts throughout the several views, FIG. 1 shows an apparatus (10) constructed in accordance with the present invention attached to the top of a tombstone (11). Referring to FIG. 3, it is noted that a saddle (12) has a flat plate (13) with an upstanding flange (14) extending around the periphery thereof. The bracket (15) has a screw (16) welded to the bottom thereof, and this screw (16) has a nut (17) welded into one end thereof as can best be seen in FIG. 6. The bracket (15) fits onto an extending tubular member (21) as can best be appreciated by viewing FIG. 6.

The member (21) is attached to a tombstone clamping structure having a front part (18) and a rear part (19). The front part of the clamping mechanism (18) has a main frame portion (22) to which the internally threaded member (21) is attached. Downwardly extending tubular members (22) on each side of the front part of the clamp (18) have rubber or plastic caps (23) frictionally disposed thereon for reasons which will be disclosed below.

Referring now to the rear portion (19) of the clamp of the present invention, it is noted that horizontally disposed portions (24) are interconnected by a right angle member (25) which has a centrally disposed opening (26) extending therethrough and a tubular guard member (27) welded thereto around the opening (26). The rear portion of the clamp (19) also has downwardly extending legs (28) on each side thereof and rubber or plastic caps (23) are also disposed thereon as in the downwardly extending legs (22) of the front portion of the clamp member (18).

To assemble the clamp structures (18) and (19), the bracket (15) is first placed in the position shown in FIG. 6 wherein the tubular portion (16) is telescoped over the tube (21). Then leg portions (31) of the clamp structure (18) are telescoped into the legs (24) on clamp portion (19) therein. Then a long threaded rod (29) having an allen head (30) thereon is placed into the guard (27) and through the opening (26) in member (25). The threaded rod (29) is threadably engaged with the nut (17) welded into the front of tubular member (16) and the elongated portion of the bolt (29) also threads into the member (21) as can readily be seen in FIG. 6. A planter box (32) can be attached to the saddle (12) by threaded bolts (33) which extend through openings (34) in the bracket (15), openings (35) which extend through the plate (13) to the saddle (12), and holes (36) which extend through the bottom of the planter box (32). Wing nuts (37) are utilized to be placed on the ends of the bolts (33) so as to tightly hold the planter box (32), the saddle (12) and the bracket (15) together.

To utilize the present invention, the apparatus (10) would be adjusted by use of an allen wrench (38), as shown in FIG. 3, extending into the allen head (30) to loosen the bolt (29) to such an extent that the legs (22) and (28) are permitted to be farther apart than the width of the tombstone (11) as shown in FIGS. 1 and 5. The apparatus (10) would then be placed onto the tombstone (11), at which time the allen wrench (38) is utilized to pull the front part of the clamp (18) towards the back part of the clamp (19) whereby the legs (22) will be moved towards the legs (28) and the rubber or plastic caps will come into firm contact with the tombstone (11) to prevent the removal of the apparatus (10) from the tombstone (11).

Referring to FIG. 6, it is noted that the guard (27) extends outwardly from, and the allen head (30) extends inwardly into the guard (27) to discourage vandals from attempting to remove the apparatus from the tombstone (11). This is effective because vandals typically do not carry an allen wrench with them and particularly an allen wrench of this particular size to fit in the head (30). Vandals typically do not plan ahead, but merely react to whatever mischevious thing is presented to them. Consequently, the guard (27) is substantially tamperproof to such a person.

Referring to FIG. 4, it is noted that flowers (39) are growing in dirt (40) placed within the planter box (32), but this dirt (40) could instead be styrofoam or the like for holding silk, plastic or dried flowers. Alternatively, this dirt (40) could instead be a sponge-like material capable of holding water and also supporting fresh flowers which have been recently cut and stuck into such sponge-like material. Also, the planter box (32) itself can be interchangeable with other structures such as a piece of styrofoam or a sponge-like material by merely removing the bolts (33) and wing nuts (37) to remove the planter box structure (32) and placing such other structures thereon and bolting them to the saddle (12) with bolts (33) and wing nuts (37), if so desired.

When it is desired to remove the apparatus (10) from the tombstone (11), the allen wrench is merely engaged into the head (30) of the elongated bolt (29) and is rotated in a direction to permit the legs (22) and (28) to be moved apart sufficiently that the plastic or rubber caps (23) no longer tightly engage the front and back of the tombstone (11), at which time the apparatus (10) can be easily lifted off of and removed from the tombstone (11).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. Apparatus comprising:
   a grave marker having a lower portion adapted to be disposed in the ground and an upper portion extending above the ground;
   a saddle disposed on top of said grave marker;
   clamp means attached to the saddle for selectively securing said saddle to a top portion of said grave marker said clamp means comprising a first assembly including a first transverse frame member, a first pair of downwardly extending legs attached to each end of said first traverse frame member and having first abutment members attached to each lower end of said first downwardly extending legs, a first pair of telescoping members extending from each end respectively of said first transverse frame member and extending transversely with respect to said first transverse member, a tubular internally threaded member rigidly attached at one end thereof to a central portion of said first transverse member and being disposed parallel to said first pair of telescoping members, a second assembly including a second traverse frame member, a second pair of downwardly extending legs attached to each end of said second transverse frame member said having second abutment members attached to each lower end of said second pair of downwardly extending legs, a second pair of telescoping members extending from each end respectively of said second transverse frame member and extending transversely with respect to said second transverse member, said first and second pairs of telescoping members being in a telescoping relationship with each other and threaded fastener means including a threaded shaft slideably disposed through a central portion of said second transverse member and having one end extending into threaded engagement with said tubular member for moving said second assembly with respect to said first assembly whereby rotation of said threaded shaft in one direction causes said first and second abutment members to move toward each other to tighten against the grave marker with equal force and rotation of said threaded shaft in the other direction permits the first and second abutment members to move apart;
   means for holding decorative objects; and
   means for attaching said decorative object holding means to said saddle whereby decorative objects can be displayed on a grave marker and held up out of the way from lawn movers or the like.

2. The apparatus of claim 1 wherein said object holding means comprises a planter box for holding dirt for growing plants therein.

3. The apparatus of claim 1 wherein said object holding means comprises a piece of styrofoam material for holding flowers.

4. The apparatus of claim 1 wherein said object holding means comprises a wet, soft sponge-like foam material for holding freshly cut flowers.

5. The apparatus of claim 1 including adjusting means connected to said attaching means and to said threaded shaft for adjusting the position of said attaching means with respect to the top of the grave marker, said adjusting means comprising:
   a second tubular member rigidly attached to said attaching means;
   an internally threaded member rigidly disposed within said tubular member and threadably engaged with said threaded shaft whereby the position of said second tubular member with respect to said threaded shaft can be adjusted prior to threaded engagement of said theaded shaft with said tubular internally threaded member whereby the position of the saddle can easily be adjusted with respect to the top front or back of the grave marker.

6. The apparatus of claim 1 wherein the other end of said threaded shaft has an enlarged allen wrench head thereon and said second transverse member has a guard rigidly attached at one end thereof to said second transverse member closely encircling all of said enlarged allen wrench head, the other end of said guard being spaced from said allen wrench by at least one length of said allen wrench head for making access to said allen wrench head inconspicuous and limiting access thereto.

* * * * *